(12) United States Patent
Kao et al.

(10) Patent No.: US 9,229,538 B2
(45) Date of Patent: Jan. 5, 2016

(54) INFORMATION INPUT UNIT AND ELECTRONIC DEVICE

(71) Applicant: Wistron Corporation, New Taipei (TW)

(72) Inventors: San-Pao Kao, New Taipei (TW); Cheng-Hsiang Chuang, New Taipei (TW); Shun-De Bai, New Taipei (TW); Bao-Jun Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 307 days.

(21) Appl. No.: 13/836,220

(22) Filed: Mar. 15, 2013

(65) Prior Publication Data

US 2013/0314345 A1 Nov. 28, 2013

(30) Foreign Application Priority Data

May 25, 2012 (TW) .............................. 101118764 A (51) Int. Cl.
*G06F 3/041* (2006.01)
*G06F 3/03* (2006.01)
*G06F 1/16* (2006.01)
*G06F 3/0338* (2013.01)
*G06F 3/0354* (2013.01)

(52) U.S. Cl.
CPC *G06F 3/03* (2013.01); *G06F 1/169* (2013.01); *G06F 3/0338* (2013.01); *G06F 3/03547* (2013.01)

(58) Field of Classification Search
CPC ... G06F 1/169; G06F 1/1616; G06F 3/03547; G06F 3/0213

USPC .......................................... 345/157, 168, 173
See application file for complete search history.

(56) References Cited

U.S. PATENT DOCUMENTS

| | | | |
|---|---|---|---|
| 6,388,660 B1 * | 5/2002 | Manser et al. ................. | 345/173 |
| 2006/0250377 A1 * | 11/2006 | Zadesky et al. ............... | 345/173 |
| 2011/0241997 A1 * | 10/2011 | Yang .............................. | 345/168 |

FOREIGN PATENT DOCUMENTS

| | | |
|---|---|---|
| TW | M408737 U1 | 8/2011 |
| TW | M419977 U1 | 1/2012 |

OTHER PUBLICATIONS

Office Action dated Oct. 14, 2014 from Taiwanese Counterpart Application No. 101118764 including an English translation.

* cited by examiner

*Primary Examiner* — Kathy Wang-Hurst
*Assistant Examiner* — Jose Soto Lopez
(74) *Attorney, Agent, or Firm* — Brinks Gilson & Lione (57) ABSTRACT

An information input unit includes a carrying module disposed on a base and movable between a first position and a second position, and an input module disposed on and moveable along with the carrying module. The input module includes a touch-pad mechanism including a touch pad configured to be pressed to a pressed position and to generate a touch signal upon being touched, a resilient supporting mechanism resiliently supporting the touch pad to enable the touch pad to return to its original position from the pressed position, and a pressing mechanism disposed below the touch pad and configured to generate a pressing signal upon being pressed by the touch pad.

12 Claims, 9 Drawing Sheets

INFORMATION INPUT UNIT AND ELECTRONIC DEVICE

CROSS-REFERENCE TO RELATED APPLICATION

This application claims priority of Taiwanese Patent Application No. 101118764, filed on May 25, 2012, the disclosure of which is incorporated herein by reference.

BACKGROUND

1. Field of the Disclosure

The disclosure relates to an information input unit, and more particularly to an information input unit incorporating a touch input function and a key input function and an electronic device comprising the information input unit.

2. Description of the Related Art

Figure 1:
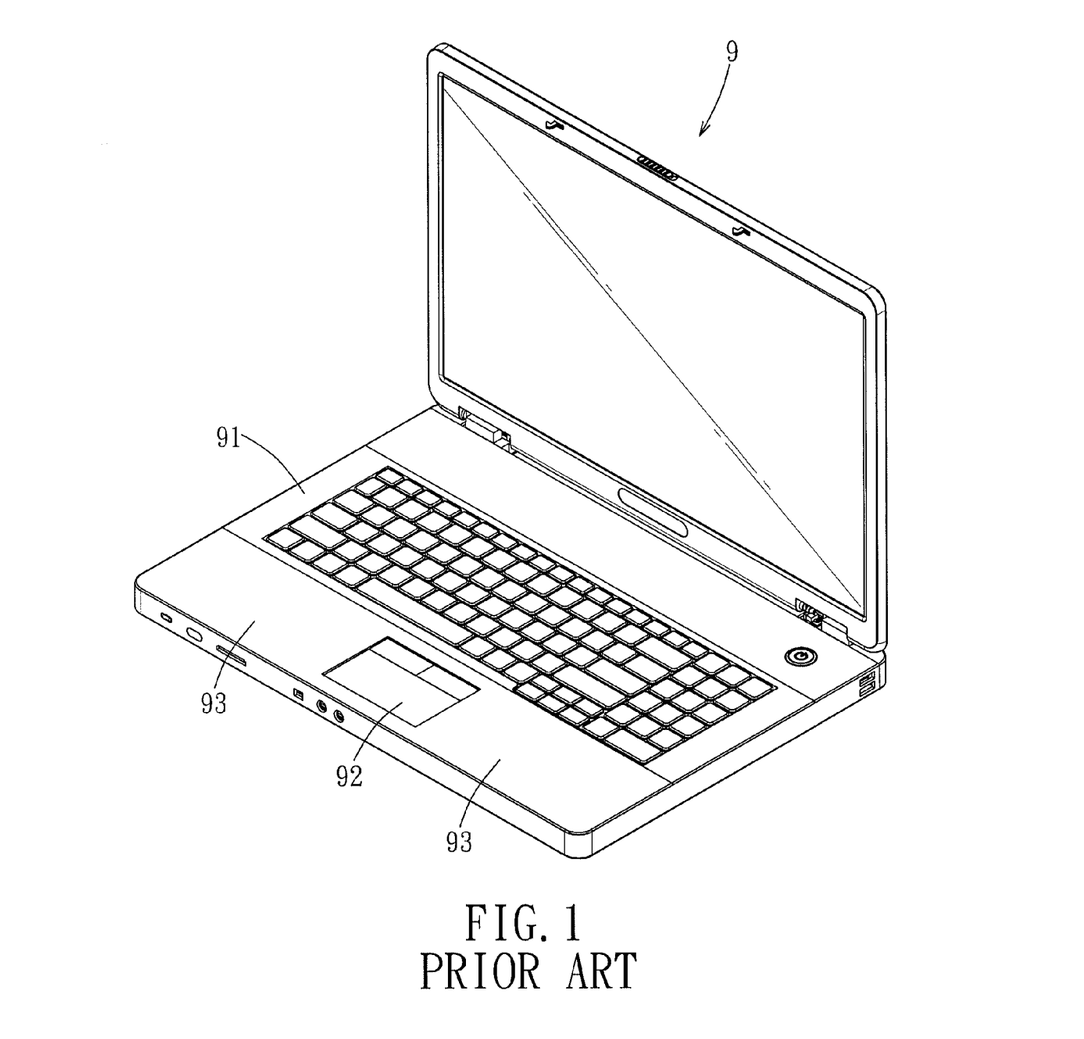
FIG. 1 is a perspective view of a conventional notebook computer.

Referring to FIG. 1, a conventional notebook computer 9 usually has a keyboard 91 and a touch pad 92. Since the touch pad 92 and the keyboard 91 are disposed separately and the touch pad 92 has a width smaller than a width of the keyboard 91, areas 93 on left and right sides of the touch pad 92 are excess areas. In other words, an additional volume is added to the notebook computer 9 for mounting the touch pad 92.

However, to be lightweight and compact is generally a development trend for a portable electronic device. Therefore, for a portable electronic device such as the notebook computer 9, how to reduce an overall volume for accommodating the keyboard 91 and the touch pad 92 is a problem to be resolved.

SUMMARY OF THE DISCLOSURE

Therefore, an object of the present disclosure is to provide an information input unit that incorporates a touch input function and a key input function and that is switchable between a touch input mode and a key input mode.

Accordingly, an information input unit of this disclosure comprises a base, a carrying module disposed on the base and movable between a first position and a second position relative to the base, an input module disposed on and movable along with the carrying module, a detector module disposed corresponding to the carrying module for detecting whether the carrying module is in one of the first position and the second position.

The input module includes a touch-pad mechanism, a resilient supporting mechanism, and a pressing mechanism. The touch-pad mechanism includes a touch pad that is configured to be pressed to move to a pressed position and that is further configured to generate a touch signal upon being touched. The resilient supporting mechanism resiliently supports the touch pad to enable the touch pad to return to its original position from the pressed position. The pressing mechanism is disposed below the touch pad, and is configured to generate a pressing signal when the touch pad moves to the pressed position and presses the pressing mechanism.

Another object of the present disclosure is to provide an electronic device provided with an information input unit.

According to another aspect, an electronic device of this disclosure comprises an information input unit and a control module.

The information input unit includes a base, a carrying module disposed on the base and movable between a first position and a second position relative to the base, an input module disposed on and movable along with the carrying module, a detector module disposed corresponding to the carrying module.

The input module includes a touch-pad mechanism, a resilient supporting mechanism, and a pressing mechanism. The touch-pad mechanism includes a touch pad that is configured to be pressed to move to a pressed position and that is further configured to generate a touch signal upon being touched. The resilient supporting mechanism resiliently supports the touch pad to enable the touch pad to return to its original position from the pressed position. The pressing mechanism is disposed below the touch pad, and is configured to generate a pressing signal when the touch pad moves to the pressed position and presses the pressing mechanism.

The detector module is configured for detecting whether the carrying module is in one of the first position and the second position, and for generating a detection result that indicates one of the first position and the second position.

The control module is electrically connected to the input module and the detector module, receives the detection result generated by the detector module, and is configured to control the input module to be in one of a touch input mode and a key input mode based on the detection result.

BRIEF DESCRIPTION OF THE DRAWINGS

Other features and advantages of the present disclosure will become apparent in the following detailed description of one embodiment with reference to the accompanying drawings, of which.

DETAILED DESCRIPTION OF THE EMBODIMENT

Figure 2:
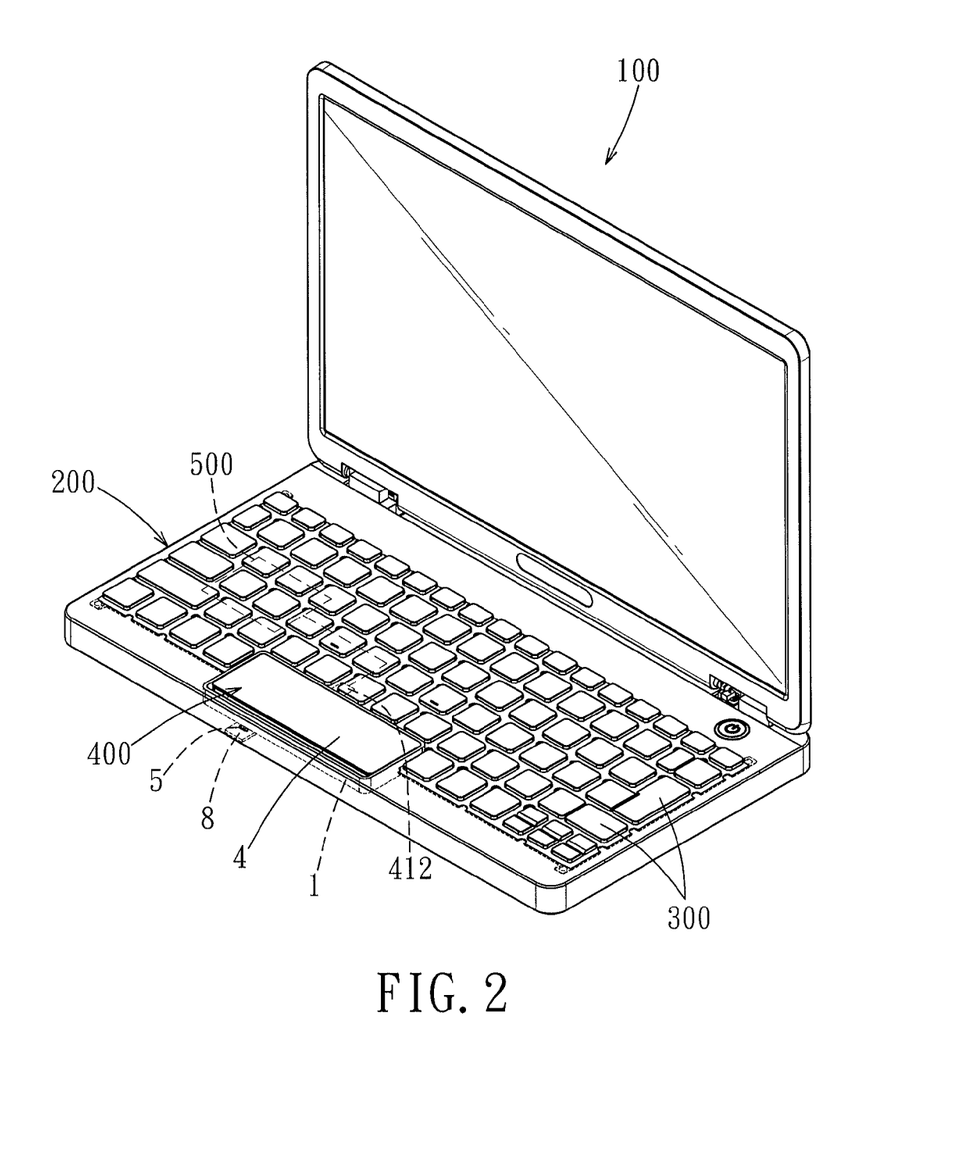
FIG. 2 is a perspective view of an electronic device according to an embodiment of the present disclosure.
Figure 3:
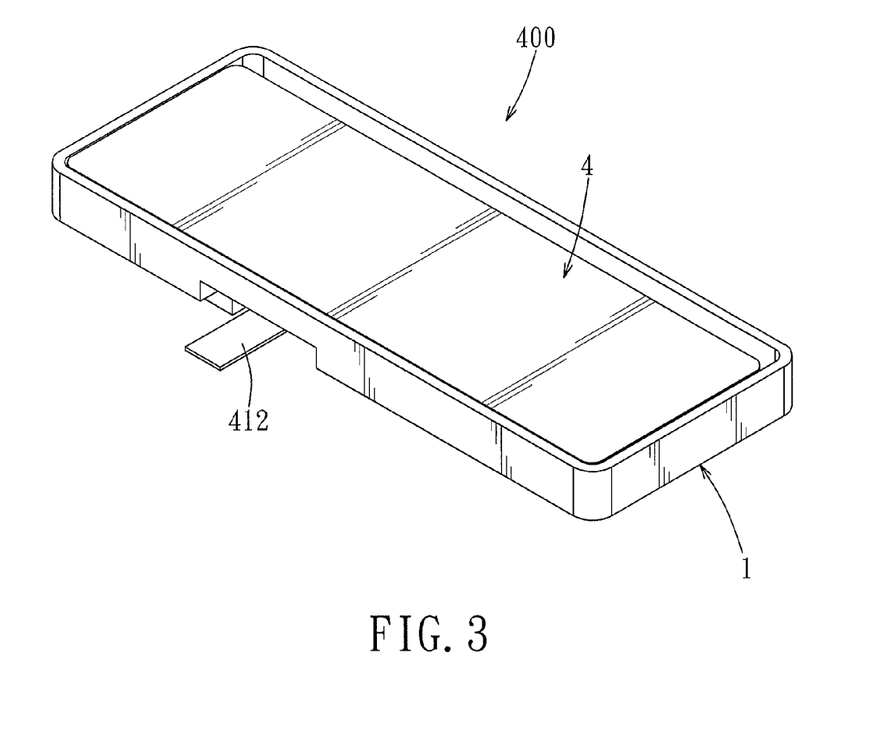
FIG. 3 is a perspective view of an information input unit of the electronic device of the embodiment.
Figure 4:
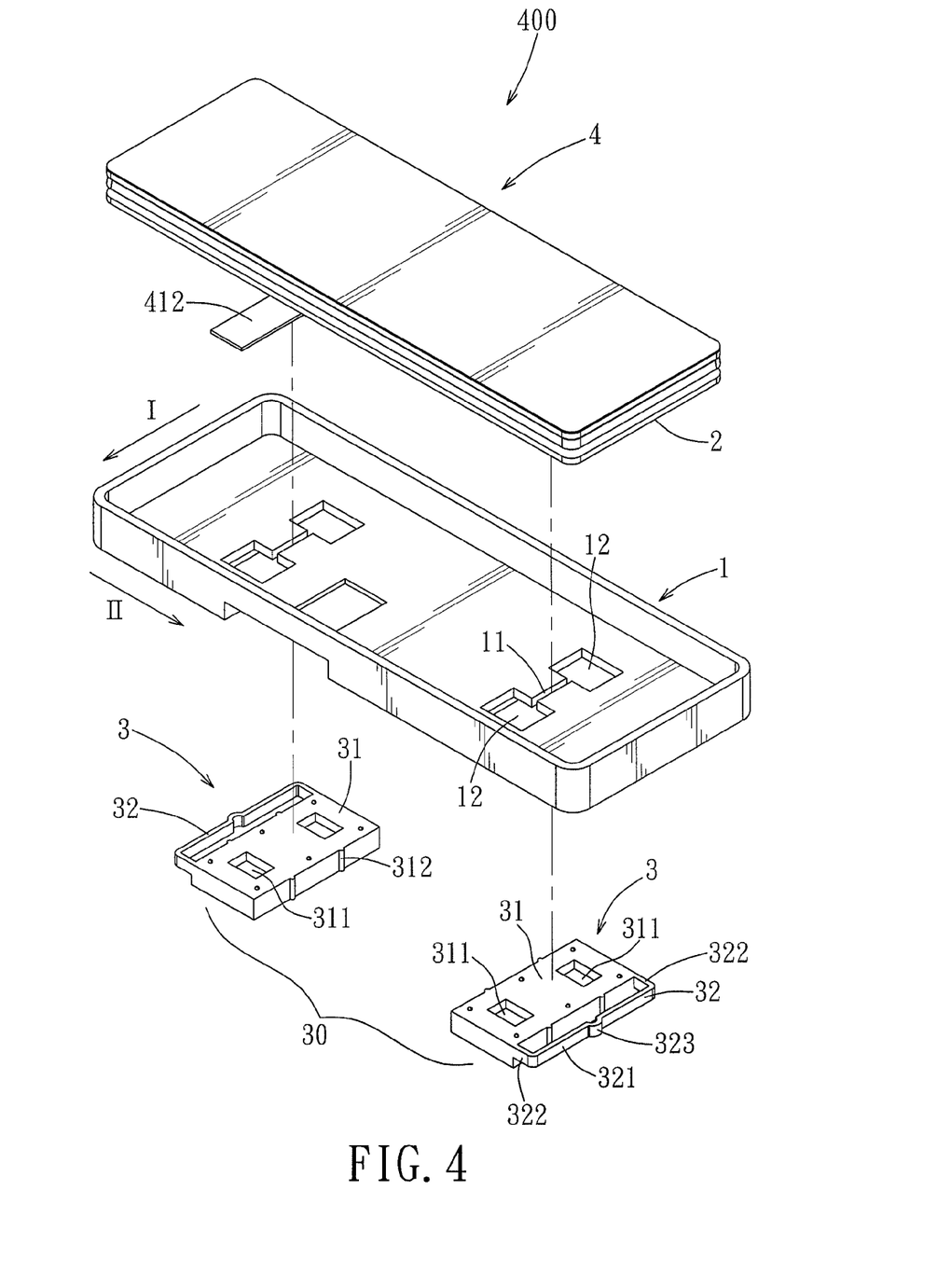
FIG. 4 is an exploded perspective view of the information input unit of FIG. 3 for illustrating a base and a carrying module of the information input unit.

Referring to FIGS. 2 and 3, an electronic device 100 according to an embodiment of the present disclosure is exemplified as a notebook computer. The electronic device 100 includes casing 200, a keyboard and a control module 500. The keyboard includes a plurality of keys 300 and an information input unit 400.

Referring to FIGS. 2 to 5, the information input unit 400 includes a base 1, a carrying module, an input module 4, and a detector module 5.

The carrying module is disposed at the base 1, is movable between a first position and a second position relative to the base 1, and includes a movable plate 2 and a positioning mechanism 30 connected to the movable plate 2. The movable plate 2 includes a plate body 21, a pair of guiding rails 22 and plural pairs of barbs 23. The plate body 21 has a top surface 211 (see FIG. 8) and a bottom surface 212 opposite to the top surface 211. The guiding rails 22 are spaced apart from each other, protrude from the bottom surface 212 of the plate body 21 and extend in a first direction (I). The plural pairs of the barbs 23 protrude from the bottom surface 212 of the plate body 21, and are close to ends of the guiding rails 22, respectively. In particular, in this embodiment, there are four pairs of the barbs 23, and two pairs of the barbs 23 are respectively disposed close to two opposite ends of a corresponding one of the guiding rails 22. The positioning mechanism 30 includes two combining components 3, and each of the combining components 3 includes a main body 31 and a resilient positioning member 32 connected to the main body 31. The main body 31 of each combining component 3 is formed with two first through holes 311 arranged along the first direction (I), and includes a plurality of protrusions 312 arranged on two lateral sides of the main body 31 along the first direction (I). The two first through holes 311 of each combining component 3 respectively correspond to the two pairs of the barbs 23 at the two opposite ends of a corresponding one of the guiding rails 22. The resilient positioning member 32 of each combining component 3 is in an elongated shape, and includes a resilient segment 321 that extends in the first direction (I) and two connecting segments 322 that respectively extend from two ends of the resilient segment 321 in a second direction (II) perpendicular to the first direction (I) and that are connected to one of the lateral sides of the main body 31. The resilient segment 321 is spaced apart from the main body 31, and has a part bent to form a protruding part 323 that is movable resiliently and slightly in the second direction (II).

Figure 6:
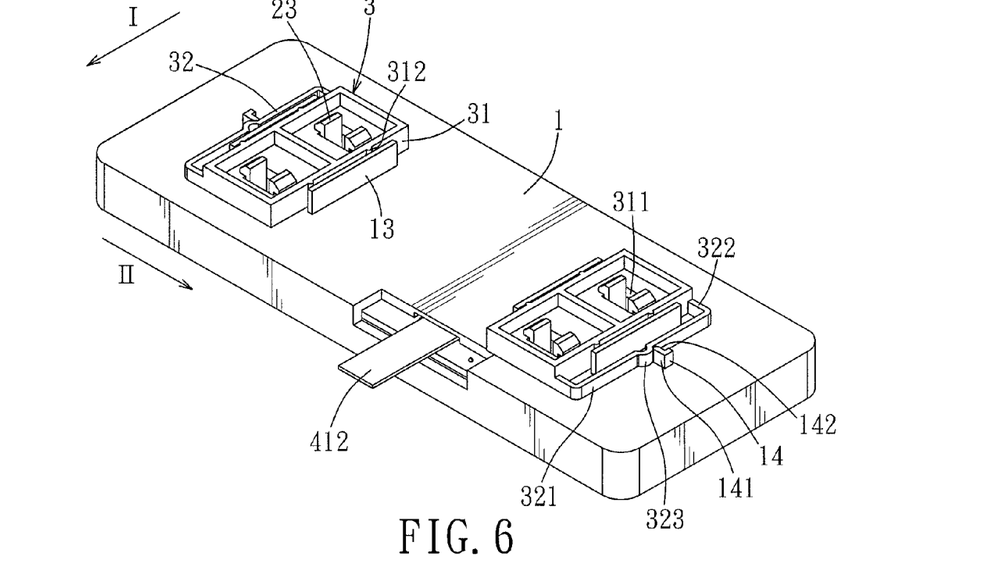
FIG. 6 is a bottom view of the information input unit of FIG. 3 for illustrating the carrying module in a first position.
Figure 7:
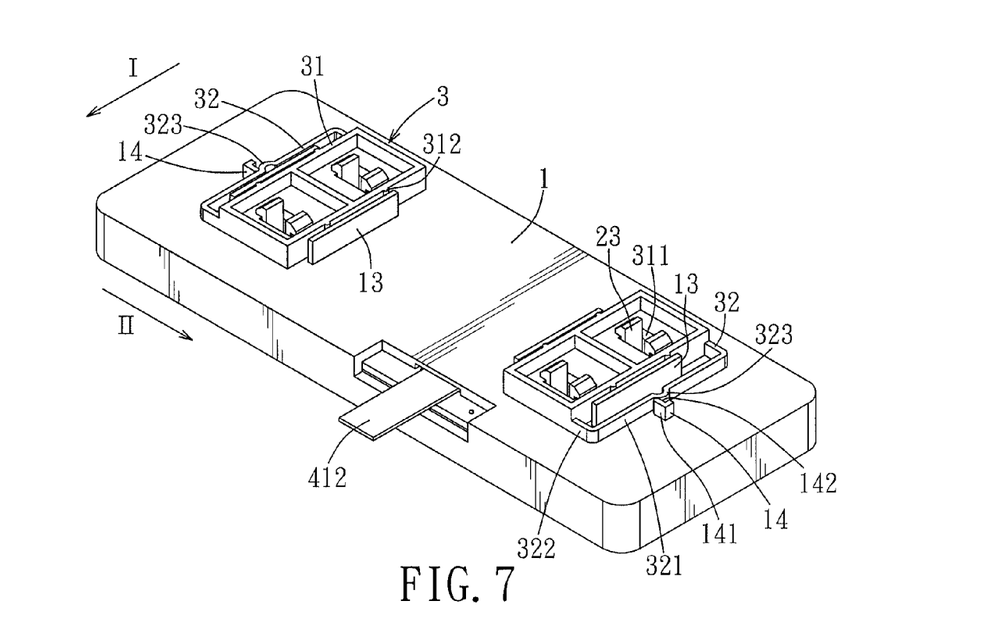
FIG. 7 is a bottom view of the information input unit for illustrating the carrying module in a second position.
Figure 9:
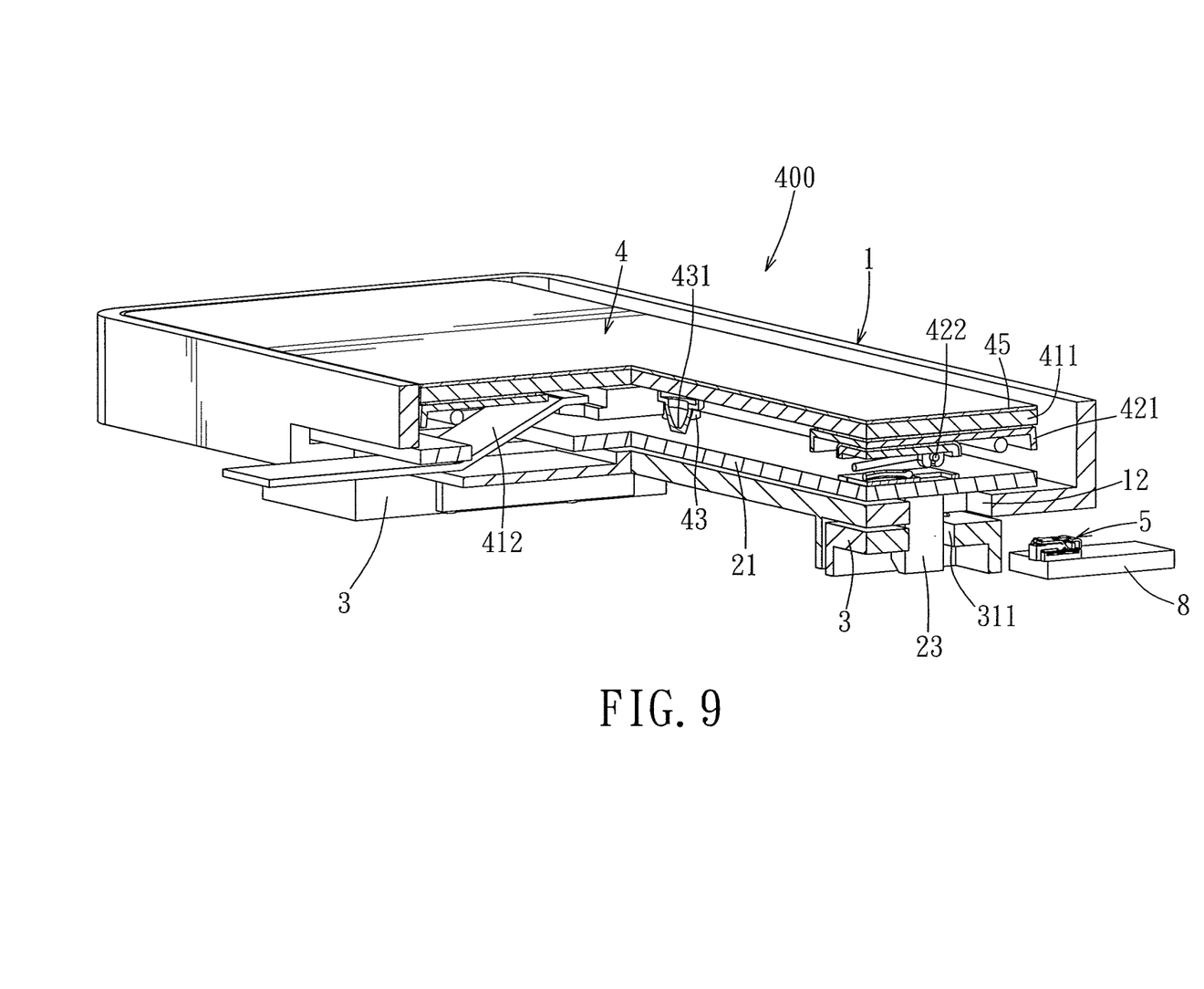
FIG. 9 is a perspective cross-sectional view for illustrating a positional relationship between the carrying module and a detector module when the carrying module is in the first position.
Figure 10:
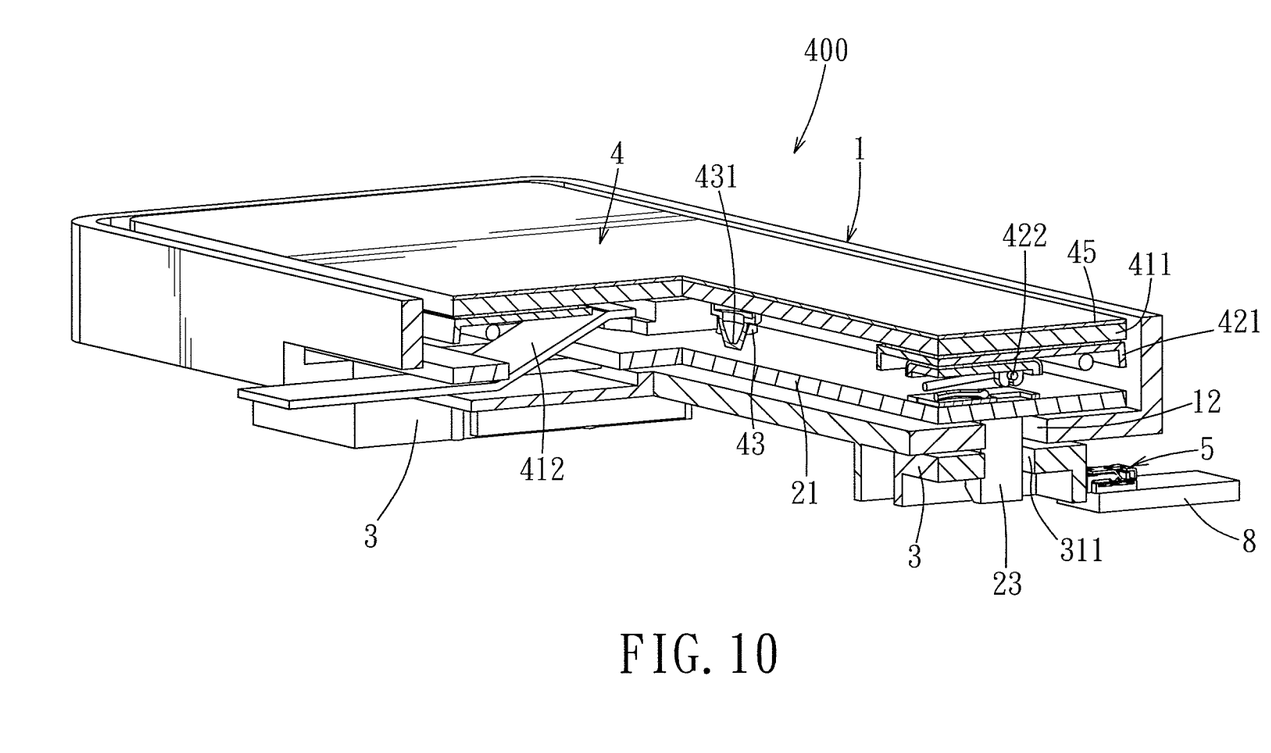
FIG. 10 is a perspective cross-sectional view similar to FIG. 9 for illustrating a positional relation between the carrying module and the detector module when the carrying module is in the second position.

The base 1 is formed with a pair of guiding grooves 11 and two pairs of second through holes 12, and includes two pairs of positioning walls 13 and a blocking mechanism. The guiding grooves 11 extend in the first direction (I), respectively accommodate the guiding rails 22, and cooperate with the guiding rails 22 to allow the carrying module to move between the first position (as shown in FIGS. 6 and 9) and the second position (as shown in FIGS. 7 and 10) along the first direction (I). The second through holes 12 are registered respectively with the first through holes 311. Each pair of the barbs 23 pass through a corresponding one of the second through holes 12 and the first through holes 311 in a corresponding one of the combining components 3 so as to engage the main body 31 of the corresponding one of the combining components 3. The second through holes 12 is sufficiently large so as to provide for the pair of barbs 23 to be movable therein along the first direction (I) (see FIGS. 9 and 10). By the engagement between the barbs 23 and the respective main body 31, the combining components 3 and the movable plate 2 are connected together, and a part of the base 1 is sandwiched between the plate body 21 and the combining components 3. Accordingly, the carrying module is movably disposed at the base 1. The positioning walls 13 extend along the first direction (I), and a part of the main body 31 of each combining component 3 is located between a corresponding pair of the positioning walls 13, allowing the main body 31 to move only along the first direction (I). The main body 31 contacts the corresponding pair of the positioning walls 13 with the protrusions 312 on the two lateral sides thereof to reduce a contact area between the main body 31 and the corresponding pair of the positioning walls 13, thereby reducing a frictional force attributed to movement of the main body 31 relative to the positioning walls 13.

Figure 5:
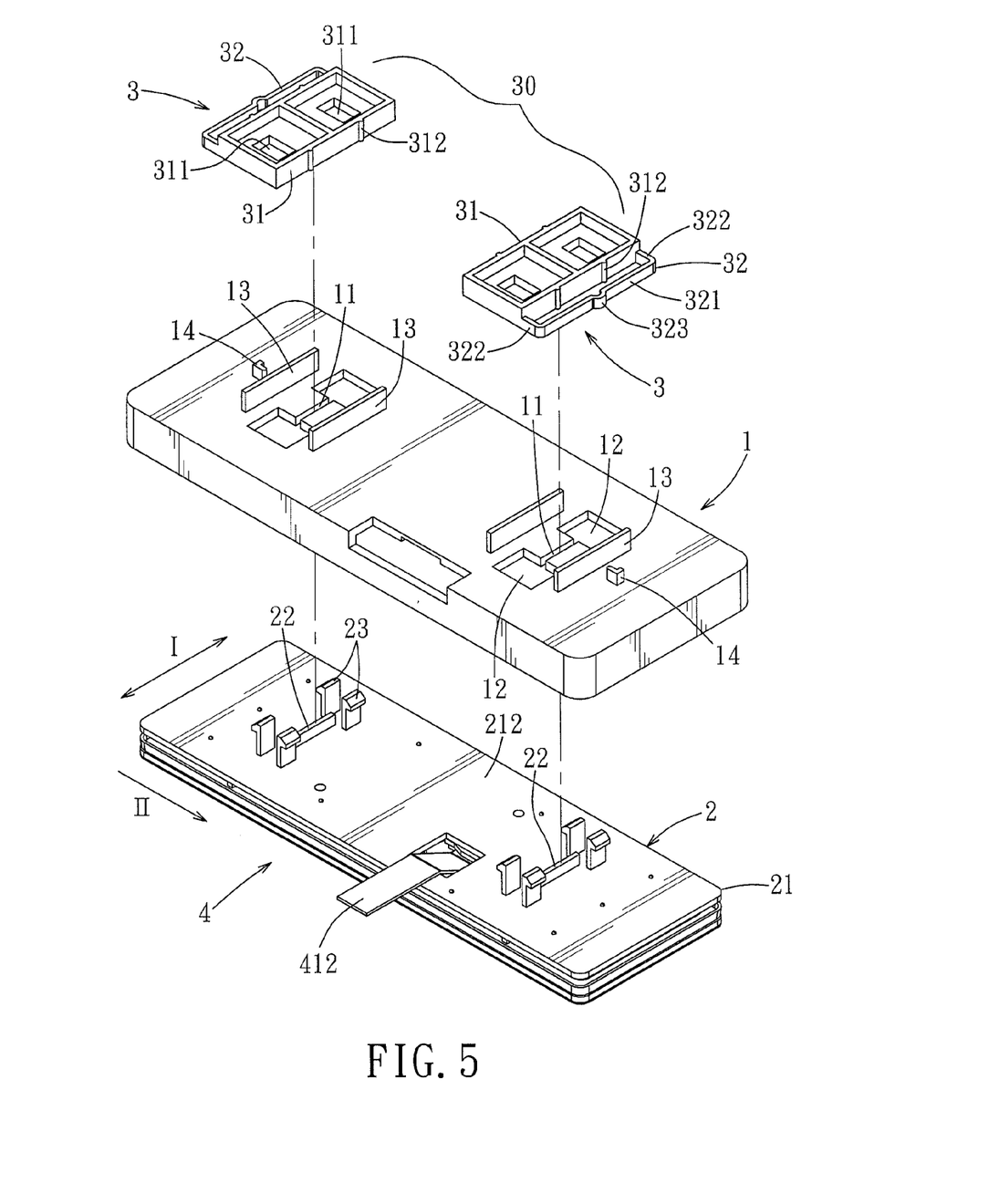
FIG. 5 is an exploded perspective view of the information input unit of FIG. 4 viewed from another angle.

Referring to FIGS. 5, 6 and 7, the blocking mechanism of the base 1 includes two blocking members 14 corresponding to the protruding parts 323 of the combining components 3, respectively. Each of the blocking members 14 has a first side part 141 and a second side part 142 opposite to each other. When the carrying module is in the first position (as shown in FIG. 6), the protruding parts 323 of the combining components 3 respectively abut against the first side parts 141 of the blocking members 14. On the other hand, when the carrying module is in the second position (as shown in FIG. 7), the protruding parts 323 respectively abut against the second side parts 142 of the blocking members 14. In particular, when the carrying module is in the first position, the protruding part 323 of each combining component 3 abuts against and is blocked by the first side part 141 of a corresponding one of the blocking members 14, so that the carrying module will not unintentionally move to the second position. When a user applies a force to push the carrying module from the first position to the second position, for each of the combining components 3, the protruding part 323 is pressed by the corresponding blocking member 14 to move resiliently along the second direction (II) towards the main body 31. After passing over the corresponding blocking member 14, the protruding part 323 is restored to its original position and abuts against the second side part 142 of the corresponding blocking member 14. As a result, the carrying module is prevented from unintentionally moving to the first position. Likewise, the user needs to apply a force to push the carrying module from the second position to the first position, and the carrying module can be moved from the second position to the first position only after the protruding part 323 passes over the corresponding blocking member 14. Thereby, the positioning mechanism 30 and the blocking mechanism cooperate to secure the carrying module in the first position or the second position. In this embodiment, the base 1 is a separate part from the casing 200, but the base 1 may also be integrally formed with the casing 200 (see FIG. 2) and is not limited in this regard. Furthermore, in other embodiments, the positioning mechanism 30 may include only one combining component 3, and the structure of the base 1 may also be varied accordingly.

Figure 8:
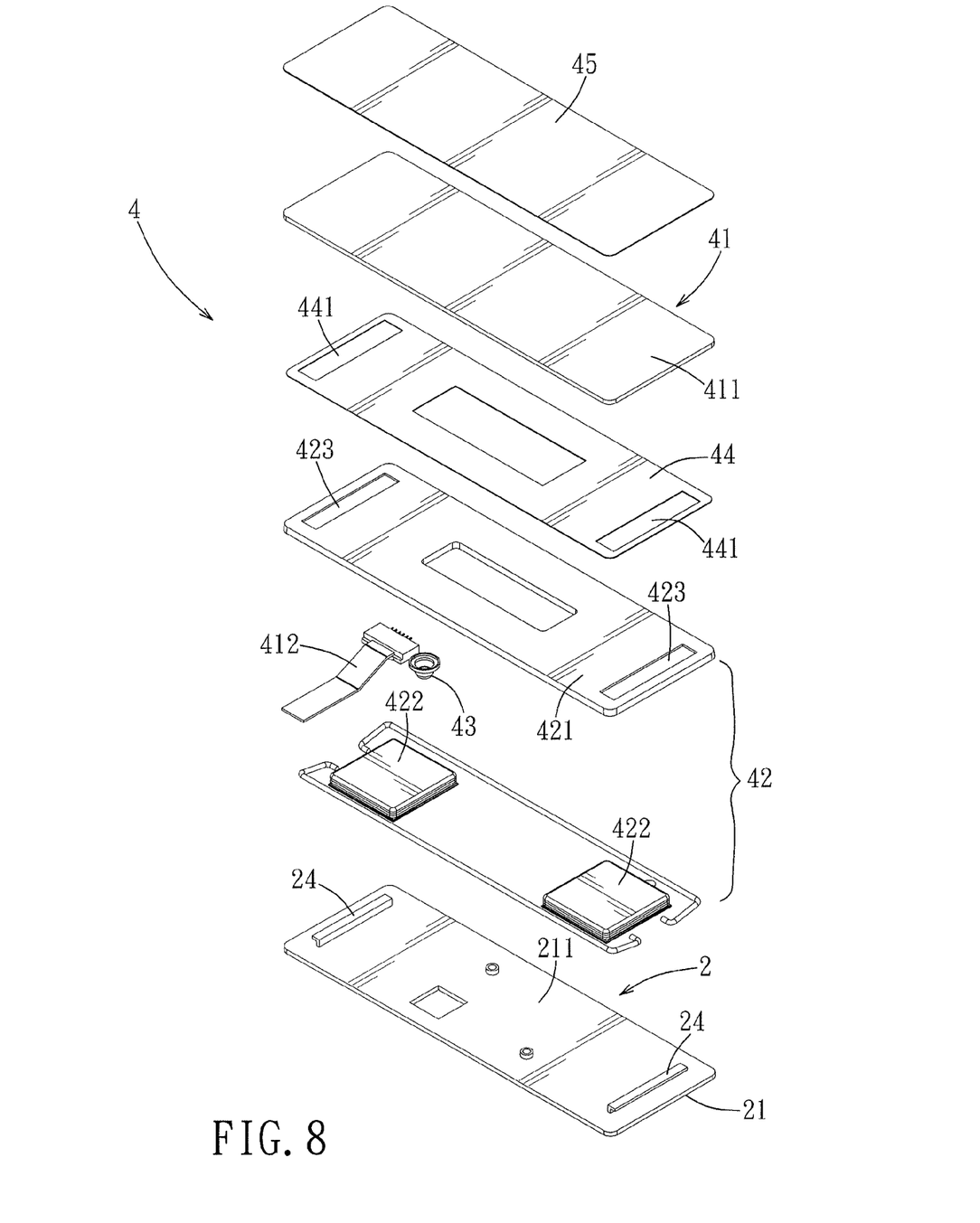
FIG. 8 is an exploded perspective view for illustrating an input module of the information input unit and an assembly relationship between the input module and the carrying module.

Referring to FIGS. 8 to 10, the input module 4 is disposed on the top surface 211 of the plate body 21 of the movable plate 2 of the carrying module, and is movable along with the carrying module. The input module includes a touch-pad mechanism 41, a resilient supporting mechanism 42, and a pressing mechanism 43. The touch-pad mechanism 41 includes a touch pad 411 and a flexible circuit board 412 electrically connected to the touch pad 411. The flexible circuit board 412 is also electrically connected to the control module 500 (see FIG. 2). The touch pad 411 is configured to generate a touch signal upon being touched and to send the touch signal to the control module 500 via the flexible circuit board 412. The resilient supporting mechanism 42 includes a supporting plate 421 and two resilient supporting members 422. The touch pad 411 and the supporting plate 421 are bonded by an adhesive layer 44, and a protective film 45 may be adhered to a top surface of the touch pad 411 for decoration and improvement of sense of touch. In this embodiment, the resilient supporting members 422 constitute a scissors-type linkage assembly disposed between the supporting plate 421 and the movable plate 2 for providing a restoring force allowing the supporting plate 421 to return to its original position after moving downward under a pressing force from the user. The movable plate 2 further includes a pair of engaging components 24 protruding from the top surface 211 of the plate body 21. Each of the supporting plate 421 and the adhesive layer 44 is formed with a pair of extension holes 423, 441 for allowing the engaging components 24 to pass therethrough, respectively, so that the engaging components 24 movably engage the supporting plate 421 and that the supporting plate 421 is movable upward and downward with respect to the plate body 21 of the movable plate 2. Since the touch pad 411 is attached to the supporting plate 421 resiliently supported by the resilient supporting mechanism 42, the touch pad 411 is movable between a normal position (as shown in FIG. 9) when no force is applied thereto, and a pressed position (not shown), where it is moved toward the movable plate 2 under an applied force. The pressing mechanism 43 is disposed below the touch pad 411 and is configured to generate a pressing signal when the touch pad 411 moves to the pressed position and presses the pressing mechanism 43. In this embodiment, the pressing mechanism 43 is a rubber dome and has an inner surface 431 facing the touch pad 411 and provided with a conductive layer (not shown). In practice, the touch pad 411 is provided with a circuit (not shown) corresponding to the conductive layer and electrically connected to the flexible circuit board 412. When the touch pad 411 is at the normal position, the conductive layer is separated from the circuit. When the pressing mechanism 43 is pressed by the touch pad 411, the conductive layer and the circuit are in contact with each other to form an electrical connection so as to generate the pressing signal for subsequent transmission to the control module 500 via the flexible circuit board 412.

Referring to FIGS. 2, 9 and 10, the detector module 5 is disposed adjacent to the carrying module. In this embodiment, the detector module 5 is a switch disposed on a circuit board 8 in the casing 200 and electrically connected to the control module 500. When the carrying module is in the first position as shown in FIGS. 6 and 9, the carrying module is spaced apart from the switch 5, and when the carrying module is in the second position as shown in FIGS. 7 and 10, one of the combining components 3 of the carrying module is in contact with the switch 5 to change an ON/OFF state of the switch 5. That is, the detector module 5 is in the OFF state when it is not in contact with said one of the combining components 3 of the carrying module (see FIGS. 6 and 9), and is in the ON state when it is in contact with said one of the combining components 3 of the carrying module (see FIGS. 7 and 10). Accordingly, the detector module 5 may detect whether the carrying module is in the first position or the second position, and may generate a detection result that indicates the first position or the second position. However, the detector module 5 is not limited to a switch, and other existing detection devices, such as an infrared ray detection device, may also be used as the detector module 5. Note that the switch 5 is relatively inexpensive.

As described above, the control module 500 is electrically connected to the input module 4 and the detector module 5 to receive the detection result generated by the detector module 5 and to control the input module 4 to be in a touch input mode or a key input mode based on the detection result. In particular, if the switch 5 is in the OFF state, i.e. the carrying module is in the first position, the control module 500 controls the input module 4 to be in the key input mode, and at this time, the input module 4 functions as a space bar of the keyboard and the pressing mechanism 43 may generate the pressing signal when the touch pad 411 moves to the pressed position and presses the pressing mechanism 43. If the switch 5 is switched to the ON state, i.e. the carrying module is in the second position, the control module 500 controls the input module 4 to be in the touch input mode, and at this time, the input module 4 is used for the touch input and the touch pad 411 maybe touched to generate the touch signal and serve as an existing touch pad. Alternatively, in a different configuration, the input module 4 may be in the touch input mode when the carrying module is in the first position, and in the key input mode when the carrying module is in the second position.

Therefore, the user may switch the input module 4 between the key input mode and the touch input mode by pushing the carrying module between the first position and the second position, and can conveniently operate the input module 4 to select a desired one of the key input mode and the touch input mode. In other words, the information input unit 400 may replace both of a space bar of a conventional keyboard and a conventional touch pad. Accordingly, the information input unit 400 may be disposed in a space where the space bar of the conventional keyboard is located, without requiring an additional space for disposing a touch pad. Moreover, the user can conveniently operate the input module 4 to select the touch input mode or the key input mode without changing the using habit of the user.

In summary, the input module 4 incorporates the touch input function and the key input function, and may be switched between the key input mode and the touch input mode by moving the carrying module between the first position and the second position. As a result, the information input unit 400 as a whole not only occupies a relatively smaller space, but also provides the convenience in switching the input modes.

While the present disclosure has been described in connection with what is considered the most practical embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An information input unit, comprising:
a base;
a carrying module that is disposed on said base and that is movable in a first direction between a first position and a second position relative to said base;
an input module that is disposed on said carrying module and that is moveable along with said carrying module, said input module including
a touch-pad mechanism which includes a touch pad, said touch pad being configured to be pressed to move to a pressed position in a pressing direction different from the first direction and being further configured to generate a touch signal upon being touched, and
a pressing mechanism which is disposed below said touch pad in the pressing direction, and which is configured to generate a pressing signal when said touch pad moves to the pressed position and presses said pressing mechanism; and
a detector module disposed corresponding to said carrying module for detecting whether said carrying module is in one of the first position and the second position,
wherein, when said carrying module is in the first position, said pressing mechanism is configured to generate the pressing signal upon being pressed as said touch pad moves to the pressed position,
wherein, when said carrying module is in the second position, said touch pad is configured to generate the touch signal upon being touched, wherein said carrying module includes a movable plate including a plate body that has a top surface and a bottom surface opposite to said top surface, and a pair of guiding rails that are spaced apart from each other and that protrude from said bottom surface of said plate body, said input module being disposed on said top surface of said plate body, wherein said base is formed with a pair of guiding grooves that respectively accommodate said guiding rails and that cooperate with said guiding rails to allow said carrying module to move between the first position and the second position along a first direction, along which said guiding grooves and said guiding rails extend, wherein said carrying module further includes a positioning mechanism connected to said movable plate, and said base includes a blocking mechanism cooperating with said positioning mechanism to secure said carrying module in the first position or the second position, wherein said positioning mechanism includes at least one combining component that includes a main body having a plurality of first through holes arranged along the first direction, said base further having a plurality of second through holes that correspond respectively in position to said first through holes, said movable plate further including plural pairs of barbs that protrude from said bottom surface of said plate body, each pair of said barbs passing through a corresponding one of said second through holes and a corresponding one of said first through holes so as to engage said main body, a part of said base being sandwiched between said plate body and said combining component.

2. The information input unit of claim 1, wherein said base further includes a pair of positioning walls extending along the first direction, a part of said main body of said combining component being located between said positioning walls.

3. The information input unit of claim 1, wherein said combining component further includes a resilient positioning member connected to said main body and including a protruding part that is movable resiliently in a second direction perpendicular to the first direction, said blocking mechanism of said base including at least one blocking member that corresponds to said protruding part and that has a first side part and a second side part opposite to each other;
wherein, when said carrying module is in the first position, said protruding part abuts against said first side part, and when said carrying module is in the second position, said protruding part abuts against said second side part.

4. The information input unit of claim 3, wherein said resilient positioning member is in an elongated shape and includes:
a resilient segment extending along the first direction, spaced from said main body, and having a part bent to form said protruding part; and
two connecting segments extending respectively from two ends of said resilient segment in the second direction and being connected to said main body.

5. The information input unit of claim 1, wherein said detector module is a switch, and said carrying module is spaced apart from said switch when in the first position, and is in contact with said switch when in the second position to change an ON/OFF state of said switch.

6. The information input unit of claim 1, further comprising a resilient supporting mechanism which resiliently supports said touch pad to enable said touch pad to return to its original position from the pressed position.

7. An electronic device, comprising:
an information input unit including
a base,
a carrying module that is disposed on said base and that is movable between a first position and a second position relative to said base in a first direction,
an input module that is disposed on said carrying module and that is movable along with said carrying module, said input module including
a touch-pad mechanism which includes a touch pad, said touch pad being configured to be pressed to move to a pressed position in a pressing direction different from the first direction and being further configured to generate a touch signal upon being touched, and
a pressing mechanism which is disposed below said touch pad in the pressing direction, and which is configured to generate a pressing signal upon being pressed as said touch pad moves to the pressed position, and
a detector module that is disposed corresponding to said carrying module for detecting whether said carrying module is in one of the first position and the second position and that is configured to generate a detection result that indicates one of the first position and the second position; and
a control module electrically connected to said input module and said detector module to receive the detection result generated by said detector module, and configured to control said input module to be in one of a touch input mode and a key input mode based on said detection result,
wherein, when said input module is in the touch input mode, said touch pad is configured to generate the touch signal,
wherein, when said input module is in the key input mode, said pressing mechanism is configured to generate the pressing signal upon being pressed as said touch pad moves to the pressed position,
wherein said carrying module includes a movable plate including a plate body that has a top surface and a bottom surface opposite to said top surface, and a pair of guiding rails that are spaced apart from each other and that protrude from said bottom surface of said plate body, said input module being disposed on said top surface of said plate body,
wherein said base is formed with a pair of guiding grooves that respectively accommodate said guiding rails and that cooperate with said guiding rails to allow said carrying module to move between the first position and the second position along a first direction, along which said guiding grooves and said guiding rails extend,
wherein said carrying module further includes a positioning mechanism connected to said movable plate, and said base includes a blocking mechanism cooperating with said positioning mechanism to secure said carrying module in the first position or the second position,
wherein said positioning mechanism includes at least one combining component that includes a main body having a plurality of first through holes arranged along the first direction, said base further having a plurality of second through holes that correspond respectively in position to said first through holes, said movable plate further including plural pairs of barbs that protrude from said bottom surface of said plate body, each pair of barbs passing through a corresponding one of said second through holes and a corresponding one of said first through holes so as to engage said main body, a part of said base being sandwiched between said plate body and said combining component.

8. The electronic device of claim 7, wherein said base further includes a pair of positioning walls extending along the first direction, a part of said main body of said combining component being located between said positioning walls.

9. The electronic device of claim 7, wherein said combining component further includes a resilient positioning member connected to said main body and including a protruding part that is movable resiliently in a second direction perpendicular to the first direction, said blocking mechanism of said base including at least one blocking member that corresponds to said protruding part and that has a first side part and a second side part opposite to each other;

wherein, when said carrying module is in the first position, said protruding part abuts against said first side part, and when said carrying module is in the second position, said protruding part abuts against said second side part.

10. The electronic device of claim 9, wherein said resilient positioning member is in an elongated shape and includes:

a resilient segment extending along the first direction, spaced from said main body, and having a part bent to form said protruding part; and two connecting segments extending respectively from two ends of said resilient segment in the second direction and being connected to said main body.

11. The electronic device of claim 7, wherein said detector module is a switch, and said carrying module is spaced apart from said switch in the first position, and is in contact with said switch when in the second position to change an ON/OFF state of said switch.

12. The electronic device of claim 7, wherein said input module further includes a resilient supporting mechanism which resiliently supports said touch pad to enable said touch pad to return to its original position from the pressed position.

* * * * *